US008612108B2

(12) United States Patent
Polimeno et al.

(10) Patent No.: US 8,612,108 B2
(45) Date of Patent: Dec. 17, 2013

(54) ENTERING AND LEAVING A MOTOR VEHICLE FREEWHEEL RUNNING CONDITION WITH INTERNAL COMBUSTION ENGINE OFF

(71) Applicant: C.R.F. Societa' Consortile Per Azioni, Orbassano (IT)

(72) Inventors: Alessandro Polimeno, Orbassano (IT); Carlo D'Ambrosio, Orbassano (IT); Roberto Finizio, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 0 days.

(21) Appl. No.: 13/748,200

(22) Filed: Jan. 23, 2013

(65) Prior Publication Data

US 2013/0190998 A1 Jul. 25, 2013

(30) Foreign Application Priority Data

Jan. 24, 2012 (EP) .................................... 12425014

(51) Int. Cl.
| | |
|---|---|
| *B60W 10/02* | (2006.01) |
| *B60W 10/30* | (2006.01) |
| *B60W 10/184* | (2012.01) |
| *B60W 30/18* | (2012.01) |
| *B60W 10/06* | (2006.01) |
| *B60W 10/18* | (2012.01) |

(52) U.S. Cl.
CPC ......... *B60W 30/18072* (2013.01); *B60W 10/02* (2013.01); *B60W 10/06* (2013.01); *B60W 10/182* (2013.01); *B60W 10/184* (2013.01); *B60W 10/30* (2013.01)
USPC ................................ 701/68; 701/54; 477/179

(58) Field of Classification Search
CPC B60W 10/02; B60W 10/06; B60W 30/18072
USPC ........................................................... 701/68
See application file for complete search history.

(56) References Cited

U.S. PATENT DOCUMENTS

| | | | | |
|---|---|---|---|---|
| 8,192,327 | B2 * | 6/2012 | Gibson et al. | 477/77 |
| 8,280,608 | B2 * | 10/2012 | Senda et al. | 701/101 |

(Continued)

FOREIGN PATENT DOCUMENTS

| | | |
|---|---|---|
| DE | 102008029453 A1 | 12/2009 |
| EP | 1491788 A1 | 12/2004 |

(Continued)

*Primary Examiner* — James Trammell
*Assistant Examiner* — Todd Melton
(74) *Attorney, Agent, or Firm* — Seed IP Law Group PLLC

(57) ABSTRACT

An automotive electronic control system for a motor vehicle is provided. The automotive electronic control system is designed to cause the motor vehicle to enter a freewheel running condition with internal combustion engine off if the automotive electronic control system determines, based on received quantities indicative of operative conditions of the motor vehicle, occurrence of a driver-performable action indicative of the will of the driver to enter a freewheel running condition with internal combustion engine off and occurrence at or within a given time from the occurrence of the driver-performable action and the maintaining for a given time of specific predetermined entry conditions. The automotive electronic control system is further designed to cause the motor vehicle to leave a freewheel running condition with internal combustion engine off if the automotive electronic control system determines, based on the received quantities, occurrence of at least one of specific predetermined exit conditions.

28 Claims, 1 Drawing Sheet

(56) References Cited

U.S. PATENT DOCUMENTS

| | | | |
|---|---|---|---|
| 8,401,768 B2* | 3/2013 | Lewis et al. | 701/112 |
| 2011/0320109 A1* | 12/2011 | Polimeno et al. | 701/113 |
| 2012/0010047 A1* | 1/2012 | Strengert et al. | 477/171 |

FOREIGN PATENT DOCUMENTS

| | | |
|---|---|---|
| EP | 2390982 A1 | 11/2011 |
| FR | 2841504 A1 | 1/2004 |
| FR | 2935125 A1 | 2/2010 |

* cited by examiner

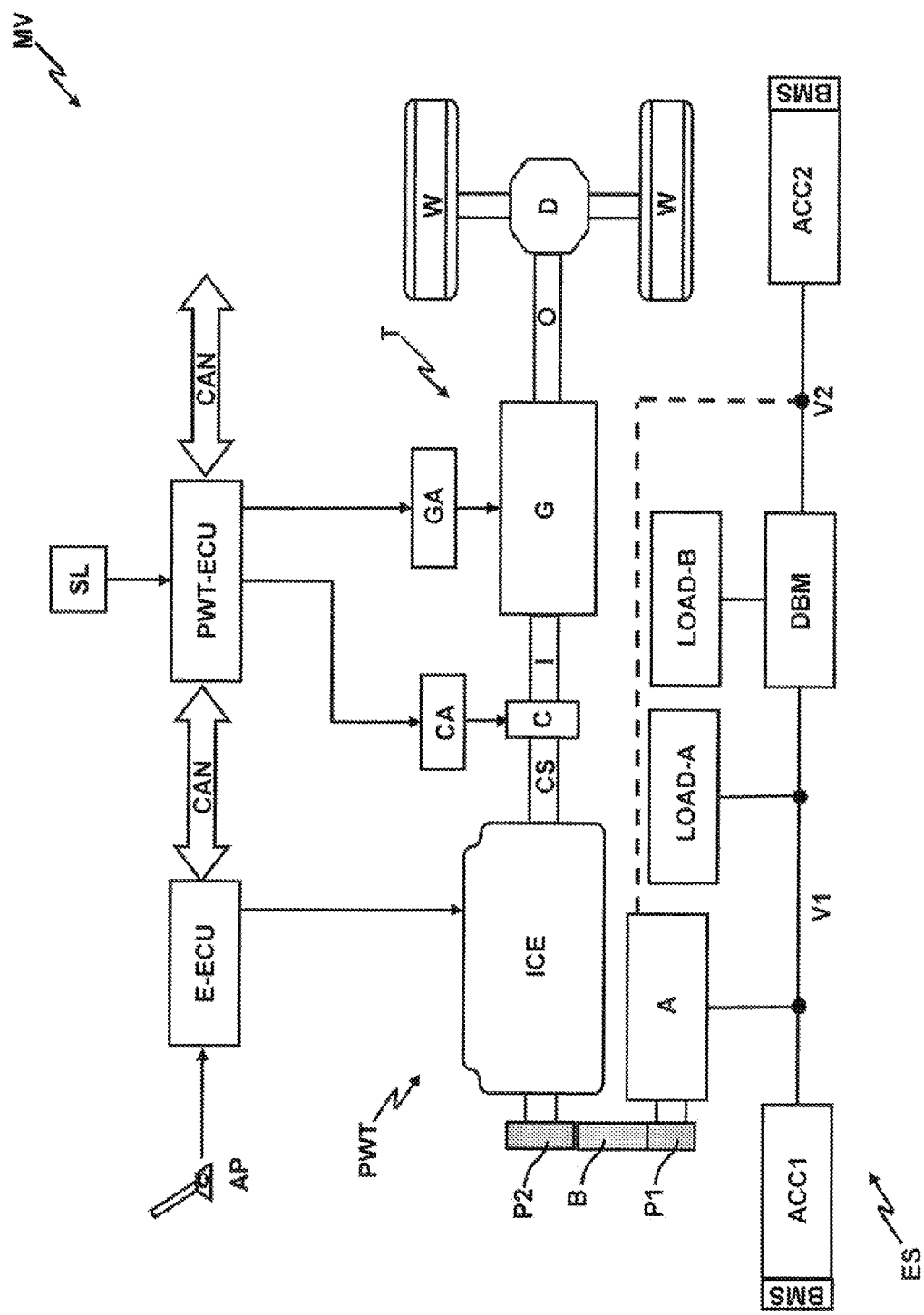

ENTERING AND LEAVING A MOTOR VEHICLE FREEWHEEL RUNNING CONDITION WITH INTERNAL COMBUSTION ENGINE OFF

BACKGROUND

1. Technical Field

The present disclosure relates to entering and leaving a motor vehicle freewheel (coast) running condition with internal combustion engine off.

2. Description of the Related Art

In order to reduce fuel consumption and pollutant emissions of motor vehicles during urban driving, automotive manufacturers are progressively introducing so-called "Stop & Start" systems in motor vehicles, which have the task of switching off the internal combustion engine when the motor vehicle is about to stop and traction power is no longer required, and in particular when the speed of motor vehicles drops below a minimum speed, currently between 0 and 10 km/h, depending on the manufacturer, and the gearbox is in neutral.

In order to further reduce fuel consumption and pollutant emissions in motor vehicles, it has been proposed to extend the operation of the Stop&Start system to motor vehicles equipped with a servo-actuated transmission, whether automatic or automated, so as to cause motor vehicles to freewheel with internal combustion engine off under special conditions. In particular, it has been proposed to stop the internal combustion engine and disengage the driveline, by disengaging the clutch, whenever the accelerator pedal is released or is not pressed for more than a given time interval, while the motor vehicle speed is less than a given speed higher than that used in Stop & Start systems, currently between 75 and 80 km/h, depending on the motor vehicle manufacturer, and then cranking the internal combustion engine and subsequently engaging the driveline, by engaging the clutch, with a speed ratio appropriate for providing the motor vehicle with traction power as soon as the accelerator pedal is pressed (again).

When the clutch is disengaged to cause the internal combustion engine switching off, the gear engaged at that moment can alternatively be kept engaged or be disengaged so as to cause the gearbox to be put into neutral. In this last case, the clutch can alternatively be re-engaged or expediently be kept disengaged, in this way reducing the wheels' drive load.

The internal combustion engine can be cranked up in various ways, in particular by inertial cranking, by fuel injection or by means of electric machines, such as the starter, which are connected to the internal combustion engine by means of belts or gears, and the way is chosen based on, amongst other things, the conditions of the motor vehicle, of the internal combustion engine and of the road (gradient, curve and grip), and on the driver's requests (pressure on the accelerator pedal, pressure on the brake pedal and use of the gearbox lever).

BRIEF SUMMARY

The Applicant has carried out an in-depth study with the objective of identifying an operational control logic for entering and leaving a motor vehicle freewheel running condition with internal combustion engine aimed at optimizing the fuel consumption and to improve comfort and driving safety of the motor vehicle.

Embodiments of the present invention provide a solution that allows the above-indicated objective to be achieved.

Embodiments of the present invention include an automotive electronic control system, an automotive electronic control unit, software loadable into processing means of an automotive electronic control system, and a motor vehicle, as defined in the appended claims.

BRIEF DESCRIPTION OF DRAWING

FIG. 1 schematically shows an automotive servo-actuated powertrain, a respective electronic control system and an automotive electrical system.

DETAILED DESCRIPTION

Embodiments of the present invention will now be described in detail with reference to the attached figures to enable a person skilled in the art to implement and use the same. Various modifications to the described embodiments will be immediately obvious to skilled persons and the generic principles described can be applied to other embodiments and applications without departing from the scope of protection of the present invention, as defined in the appended claims. Therefore, in the following claims, the terms used should not to be considered to limit the claims to the described and illustrated embodiments, but should be accorded the broadest scope of protection according to the principles and characteristics described herein along with the full scope of equivalents to which such claims are entitled.

In the attached FIGURE is illustrated, by way of a non-limitative example, a block diagram of a powertrain PWT of a motor vehicle MV. The powertrain PWT comprises an internal combustion engine ICE, e.g., a spark-ignition or diesel engine with a crankshaft CS connected to a servo-actuated driveline T.

The driveline T can indifferently be of the single clutch type, as shown in the attached FIGURE, or with a double clutch (not shown).

In the case of a single-clutch driveline T, as shown in the attached FIGURE, the driveline T comprises a discrete-speed ratio gearbox G, with an input shaft I connectable to the crankshaft CS through a single clutch C external to the gearbox G and an output shaft O connected to a pair of driving wheels W through a differential D of known type. The gearbox G can be either electrical, electrohydraulic or electro-mechanical.

The clutch C is servo-controlled by means of an associated electrically or electro-hydraulically controlled actuator CA and the gearbox G is also servo-controlled by means of a plurality of electrically, electro-hydraulically or electro-mechanically controlled actuators, indicated as a whole by GA, operable to cause engagement and disengagement of the gears to different feasible speed ratios.

In the case, however, of a double-clutch driveline T, instead of a single clutch C external to the gearbox G, the driveline T comprises two distinct clutches (not shown), one associated with the even gears and the other associated with the odd gears, integrated inside the gearbox G.

The internal combustion engine ICE is controlled by a first electronic control unit E-ECU that is coupled to the accelerator pedal AP and/or to a position sensor (not shown) coupled to said accelerator pedal AP and that, known per se and hence not described in detail, while the powertrain PWT as a whole is controlled by an electronic control unit PWT-ECU which is connected to the first electronic control unit E-ECU via the CAN (Controller Area Network) of the motor vehicle MV as well as to the actuators CA and GA associated, respectively, with the clutch C and the gearbox G.

The second electronic control unit PWT-ECU is designed to change, i.e., engage/disengage, the speed ratios in automatic or semi-automatic mode properly actuating the clutch C and the gearbox G by way of respectively associated actuators CA and GA.

The second electronic control unit PWT-ECU is coupled to a selector SL operable by the driver (not shown) of the motor vehicle MV to select/deselect different implementation modes of the driveline T, which, for example, can conveniently comprise:

- an automatic mode wherein the speed ratios are changed automatically by the second electronic control unit PWT-ECU;
- a semi-automatic mode wherein the driver of the motor vehicle MV controls the speed ratios of the sequential gearbox by way of the selector SL or specific sequential gearbox means (not shown), for example installed on the steering wheel (not shown), coupled to the second electronic control unit PWT-ECU; and
- a neutral mode wherein the gearbox G is in neutral.

In particular, the selector SL, which, for example, can be conveniently made in the form of selection lever, is designed to assume, when properly handled by the driver, different operative positions each of which is associated with a corresponding implementation mode of the driveline T, i.e., such as to select a corresponding implementation mode of the driveline T.

In any case, the selector SL, which can also be realized in different forms with respect to a selection lever, it is known per se and is therefore not described here in detail.

Furthermore, the second electronic control unit PWT-ECU is programmed to cause the motor vehicle MV to enter a freewheel running condition with internal combustion engine off causing the disengaging of the driveline T and the switching off of the internal combustion engine ICE if the occurrence of predetermined entry conditions is detected.

In particular, to cause the motor vehicle MV to enter a freewheel running condition with internal combustion engine off, the second electronic control unit PWT-ECU:

- actuates the actuator CA associated with the clutch C so as to disengage the clutch C and, then, so as to cause the disengaging of the driveline T, and
- controls the first electronic control unit E-ECU to cause the switching off of the internal combustion engine ICE.

Furthermore, the second electronic control unit PWT-ECU is programmed to cause the motor vehicle MV to leave a freewheel running condition with internal combustion engine off causing the cranking of the internal combustion engine ICE and the engaging of the line transmission T if the occurrence of one or more predetermined exit conditions is detected.

In particular, to cause the motor vehicle MV to leave a freewheel running condition with internal combustion engine off, the second electronic control unit PWT-ECU:

- controls the first electronic control unit E-ECU causing the cranking of the internal combustion engine ICE;
- actuates the actuators GA associated with the gearbox G so as to engage a gear suitable to crank the internal combustion engine ICE; and
- actuates the actuator AC associated with the clutch C so as to engage said clutch C and, then, so as to cause the engaging of the driveline T.

The internal combustion engine ICE can be cranked in three different cranking modes, specifically:

- fuel injection, or
- inertial cranking, i.e., by dragging engaging the clutch C in accordance to the suitably selected speed ratio for said cranking mode according to predetermined conditions of the motor vehicle MV (speed and acceleration), and of the road (gradient and curve), or
- operating a starter motor (not shown).

The cranking mode of the internal combustion engine ICE and the speed ratio suitable to crank the internal combustion engine ICE used by the second electronic control unit PWT-ECU to cause the motor vehicle MV to leave a freewheel running condition with internal combustion engine off depends on the speed of the motor vehicle MV and the rate of pressure of the accelerator pedal AP at the time in which said motor vehicle MV must leave a freewheel running condition with internal combustion engine off. In particular, the selection logic of the internal combustion engine ICE cranking mode and the speed ratio suitable to crank the internal combustion engine ICE to cause the motor vehicle MV to leave a freewheel running condition with internal combustion engine off is not described here in detail since it is not critical to the present invention.

In a different embodiment, entering and leaving the motor vehicle freewheel running condition with internal combustion engine off may be conveniently controlled by the first electronic control unit E-ECU of the internal combustion engine ICE instead by the second electronic control unit PWT-ECU of the powertrain PWT.

In particular, according to said different embodiment, to cause the motor vehicle MV to enter a freewheel running condition with internal combustion engine off, the first electronic control unit E-ECU:

- controls the second electronic control unit PWT-ECU to cause the disengaging of the driveline T; and
- causes the switching off of the internal combustion engine ICE.

Moreover, again according to said different embodiment, to cause the motor vehicle MV to leave a freewheel running condition with internal combustion engine off, the first control unit E-ECU:

- causes the cranking of the internal combustion engine ICE according to one of three different modes described above (and, in the case of inertial cranking, commanding the second electronic control unit PWT-ECU to cause the engaging of the driveline T with a ratio of speed suitable to crank the internal combustion engine ICE); and
- controls the second electronic control unit PWT-ECU to cause the engaging of the driveline T with a speed ratio suitable for traction.

According to a further different embodiment, the first electronic control unit E-ECU of the internal combustion engine ICE and the second electronic control unit PWT-ECU of the powertrain PWT could be integrated into a single electronic control unit ECU.

Moreover, again with reference to the attached FIGURE, the motor vehicle MV also comprises an electric system ES which comprises:

- a first electrical energy storage device, in particular a first battery, ACC1 which provides a first supply voltage V1;
- a second electrical energy storage device, in particular a second battery, ACC2 which provides a second supply voltage V2;
- sensors BMS coupled to the first battery ACC1 and to the second battery ACC2 to determine a respective state of electric charge and a corresponding state of functional integrity;
- a switch module, hereinafter referred to as dual battery manager DBM, coupled to the first battery ACC1 and to the second battery ACC2;

first electrical loads that are collectively referred to as LOAD-A, together represent the first on-board electrically powered/driven systems of the motor vehicle MV and are directly connected to the first battery ACC1, i.e., without the interposition of other components, and indirectly to the second battery ACC2 by way of the dual battery manager DBM;

second electrical loads that are collectively referred to as LOAD-B, together represent second on-board electrically powered/driven systems of the motor vehicle MV and are indirectly connected to the first battery ACC1 and to the second battery ACC2 by way of the dual battery manager DBM, and an alternator A that can be directly coupled to the first battery ACC1 and the first electrical loads LOAD-A, or can be directly coupled to the second battery ACC2 and, by way of the dual battery manager DBM, to the second electrical loads LOAD-B; said alternator A being coupled to the internal combustion engine ICE by way of a transmission belt B and a plurality of pulleys (in the attached FIGURE indicated in general with P1 and P2) coupled to said drive belt B, and being designed to transform the machine torque generated by the internal combustion engine ICE and transferred to said alternator A via the drive belt B and the pulleys P1 and P2 into electrical energy for use within the electric system ES, for example, to charge the first battery ACC1 and/or the second battery ACC2.

The dual battery manager DBM, in use, can cause the second electrical loads LOAD-B to be powered only by the first battery ACC1, or only by the second battery ACC2, or by both batteries ACC1 and ACC2.

The double battery electric system ES also comprises a starter motor (not shown) operable to crank the internal combustion engine ICE and is controlled by a respective control unit ES-ECU (not shown) which could alternatively be an electronic control unit specifically dedicated to the control of the electric system ES and then be distinguished both from the first electronic control unit E-ECU of the internal combustion engine ICE and from the second electronic control unit PWT-ECU of the powertrain PWT and communicate with these latter through the network CAN of the motor vehicle MV, or it could be integrated together with the first electronic control unit E-ECU of the internal combustion engine ICE and the second electronic control unit PWT-ECU of the powertrain PWT in a single electronic control unit ECU.

The functioning of the double battery electric system ES and, in particular, the functioning of the respective control unit ES-ECU and the dual battery manager DBM are not described here in detail since they are not critical to the present invention. By way of example, the double battery electric system ES, the respective control unit ES-ECU and the dual battery manager DBM can be conveniently designed to operate, during the freewheel running condition with internal combustion engine off of the motor vehicle MV, as described in European patent application number 10425176.4 filed on 25 May 2010 in the name FIAT Group Automobiles S.p.A. and published on 30 Nov. 2011 with publication number EP 2390982 A1.

A manual transmission motor vehicle differs from the motor vehicle MV with servo-actuated driveline (i.e., with automatic transmission) shown in the attached FIGURE and described above in that it does not comprise neither the second electronic control unit PWT-ECU of the powertrain PWT, nor the actuators CA and GA associated, respectively, to the clutch C and the gearbox G.

In particular, in a motor vehicle with a manual transmission, the clutch C is operable by the driver of the motor vehicle by using the clutch pedal (not shown) and the gearbox G is operable by the driver of the motor vehicle by using the gearbox lever (not shown).

In a motor vehicle with a manual transmission the electronic control unit E-ECU of the internal combustion engine ICE can be conveniently programmed to cause said motor vehicle to enter a freewheel running condition with internal combustion engine off causing the switching off of the internal combustion engine ICE in case it detects the disengaging of the driveline T and the occurrence of predetermined entry conditions.

In particular, to cause the motor vehicle with a manual transmission to enter a freewheel running condition with internal combustion engine off, the electronic control unit E-ECU of the internal combustion engine ICE causes the switching off of said internal combustion engine ICE if the gearbox G is put in neutral and the occurrence of predetermined entry conditions is detected.

Moreover, in a motor vehicle with a manual transmission, the electronic control unit E-ECU of the internal combustion engine ICE can be conveniently programmed to cause said motor vehicle to leave a freewheel running condition with internal combustion engine off causing the cranking of the internal combustion engine ICE in case it detects the engaging of the driveline T and the occurrence of one or more predetermined exit conditions.

In particular, to cause the motor vehicle with a manually-operable transmission to leave a freewheel running condition with internal combustion engine off, the electronic control unit E-ECU of the internal combustion engine ICE causes the cranking of the internal combustion engine ICE if the pressure of the clutch pedal and/or the insertion of a speed ratio and the occurrence of one or more predetermined exit conditions is detected.

Conveniently, the electronic control unit E-ECU of the internal combustion engine ICE of a motor vehicle with a manual transmission can be designed to display, for example on the instruments panel (not shown) installed on the dashboard (not shown) of said motor vehicle, the speed ratio suitable to crank the internal combustion engine ICE to cause said motor vehicle to leave a freewheel running condition with internal combustion engine off. For example, the speed ratio suitable to crank the internal combustion engine ICE may be displayed in the form of an icon and/or a graphic symbol. In this way the driver of the motor vehicle with a manual transmission is informed of which speed ratio should be inserted, via the actuation of the clutch pedal and of the gearbox lever, causing said motor vehicle to leave a freewheel running condition with internal combustion engine off.

Embodiments of the present invention relate to an entering and leaving control logic of a motor vehicle with automatic or manually-operable transmission, like those previously described, to/from a freewheel running condition with internal combustion engine off resulting from the aforementioned study conducted by the Applicant.

In particular, according to one or more embodiments of the present invention, one or more automotive electronic control units are designed to store and execute one or more automotive control software designed to implement, when executed, the control logic developed by the Applicant.

In the following, the entering and leaving control logic of a motor vehicle with automatic or manual transmission, like those previously described, to/from a freewheel running condition with internal combustion engine off according to embodiments of the present invention will be described, for simplicity of description, making explicit reference to an automotive electronic control system installed on board of said motor vehicle and designed to implement said control logic.

It remains, however, understood that the control logic according to embodiments of the present invention can be conveniently implemented by a single electronic control unit ECU of the internal combustion engine ICE and of the powertrain PWT of a motor vehicle with automatic transmission, or in cooperation by two separate electronic control units E-ECU and PWT-ECU of the internal combustion engine ICE and of the powertrain PWT of a motor vehicle with automatic transmission, or by the electronic control unit E-ECU of the internal combustion engine ICE of a motor vehicle with a manual transmission, or by an electronic control unit specifically installed on board of a motor vehicle with automatic or manual transmission, dedicated to the entering and leaving control of said motor vehicle to/from a freewheel running condition and with internal combustion engine and coupled via the CAN network to other electronic control units installed on board of the motor vehicle for the exchange of data/information/controls with the latter (for example, the electronic control units E-ECU and PWT-ECU of the internal combustion engine ICE and the powertrain PWT, the single electronic control unit ECU of the internal combustion engine ICE and the powertrain PWT, the electronic control unit of the electric system ES-ECU, etc.).

In fact, it is emphasized that, for the purposes of embodiments of the present invention, it is not important which and how many functions are specifically carried out by each electronic control unit involved in the control of the entering and leaving of the motor vehicle to/from a freewheel running condition with internal combustion engine off, but is important for the purposes of embodiments of the present invention, only which functions may be performed in order to cause a motor vehicle to enter and leave a freewheel running condition with internal combustion engine off. For this reason, then, and also for ease of description, in the following description we will refer generically to the functions performed by an automotive electronic control system, without specifying by which electronic control unit these functions are specifically carried out.

The automotive electronic control system according to embodiments of the present invention is designed to cause, i.e., to control, a motor vehicle with automatic or manually-operable transmissions to enter a freewheel running condition with internal combustion engine off if said automotive electronic control system detects, i.e., determines the occurrence of an action performed by the driver of the motor vehicle indicative of the will of the driver to enter a freewheel running condition with internal combustion engine off and if said automotive electronic control system detects, i.e., determines, the occurrence, at, or within a given time ($T_{ES\&S1}$) from, the occurrence of said action and the maintaining for a given time ($T_{ES\&S2}$) of also the following additional entry conditions:

the brake pedal (not shown) is not pressed;
the hand brake (not shown) is not actuated;
the motor vehicle speed is within a predetermined range of values of speed allowed, e.g., is between 3 km/h and 75 km/h;
the charge state of each electric energy storage device, for example of each of the two batteries ACC1 and ACC2, is higher than a first predetermined threshold of electric charge, for example, is more than 75% of the respective complete electric charge;
the functional integrity status of each energy storage device, for example of each of the two batteries ACC1 and ACC2, is higher than a first predetermined threshold state of functional integrity, and
specific on-board systems/components do not indicate neither failure nor malfunction.

In other words, the entry conditions are enabling conditions for the motor vehicle to enter a freewheel running condition with internal combustion engine off.

Preferably, these specific on-board systems/components may comprise one or more of the following on-board systems/components:

in the case of a motor vehicle with automatic transmission, the single electronic control unit ECU of the internal combustion engine ICE and of the powertrain PWT, or the two separate electronic control units E-ECU and PWT-ECU of the internal combustion engine ICE and of the powertrain PWT;
in the case of a motor vehicle with a manual transmission, the electronic control unit E-ECU of the internal combustion engine ICE;
in the case of a motor vehicle with a manual or automatic transmission, the control unit ES-ECU of the electric system ES, the dual battery manager DBM, the sensors BMS, the position sensor of accelerator pedal AP, on-board systems/components critical for the running safety of the motor vehicle (not shown) and sensors (not shown) associated with on-board systems/components critical for the running safety of the motor vehicle.

Preferably, as on-board systems/components critical for the running safety of the motor vehicle the power steering can be considered the braking system and the sensors and subsystems associated with it, such as the brake pedal sensor, the Antilock Braking System—ABS and the Electronic Stability Control (ESC) system, also known as Motor vehicle Dynamic Control (VDC) system, the lighting system, wipers, etc.

Conveniently, the time $T_{ES\&S1}$ wherein the entry conditions must be maintained may be equal to, or different from, the time $T_{ES\&S2}$ wherein said entry conditions must occur.

Moreover, again conveniently, the time $T_{ES\&S1}$ wherein the entry conditions must be maintained can be temporally subsequent to, or partially or totally superimposed on the, time $T_{ES\&S2}$ wherein said entry conditions must occur.

According to a preferred embodiment of the present invention, the automotive electronic control system is designed to cause, i.e., to control the motor vehicle to enter a freewheel running condition with internal combustion engine off if said automotive electronic control system determines the occurrence of an action performed by the driver of the motor vehicle indicative of the will of the driver to enter a freewheel running condition with internal combustion engine off and if said automotive electronic control system determines the occurrence of the entry conditions at the occurrence of said action and the maintaining for a given time $T_{ES\&S2}$ of said entry conditions.

Conveniently, the automotive electronic control system is designed to detect, i.e., to determine, the occurrence of an action performed by the driver indicative of the will of the latter to enter a freewheel running condition with internal combustion engine off if said automotive electronic control system determines the occurrence of one of the following conditions:

in the case of a motor vehicle with automatic transmission, the driver releases the accelerator pedal AP, or
the driver releases the accelerator pedal AP, and performs a specific actuation of the selector SL or activates the selector SL so as to cause said selector SL to assume a specific operative position, such as the operative position associated with the neutral mode or a predetermined operative position specifically provided for allowing the driver to indicate his will to enter a freewheel running condition with internal combustion engine off, that is, associated with the freewheel running condition with internal combustion engine off, or the driver releases the accelerator pedal AP, and imparts, by way of specific user-activatable means (not shown), such as a button arranged in correspondence to the driver's seat, for example on the steering wheel or on the dashboard or on the selector SL, a specific executive control to enter a freewheel running condition with internal combustion engine off, while, in the event of a motor vehicle with manual transmission, the driver puts the gearbox G in neutral by way of the gearbox lever and releases the clutch pedal, or puts in neutral the gearbox G by way of the gearbox lever, releases the clutch pedal and imparts, through specific means that can be activated by a user, such as a button arranged in correspondence to the driver's seat, for example on the steering wheel or on the dashboard or on the gearbox lever, a specific executive control to enter a freewheel running condition with internal combustion engine off.

Conveniently, the automotive electronic control system is designed to cause the motor vehicle to enter a freewheel running condition with internal combustion engine off if said automotive electronic control system determines the occurrence, at, or within a given time ($T_{ES\&S1}$) from, the occurrence of said action and the maintaining for a given time ($T_{ES\&S2}$) of also the following additional entry conditions:

in the case of a motor vehicle with manual transmission, the clutch pedal is not pressed and/or the gearbox lever is not activated by the driver of the motor vehicle, while in the case of a motor vehicle with automatic transmission, the selector SL is not activated by the driver of the motor vehicle.

In other words, the actuation of the clutch pedal and/or the gearbox lever by the driver of a motor vehicle with a manual transmission and the actuation of the selector SL by the driver of a motor vehicle with automatic transmission may conveniently be disabling conditions for the motor vehicle to enter a freewheel running condition with internal combustion engine off.

Alternatively, in the case of a motor vehicle with automatic transmission, the automotive electronic control system may be conveniently designed to cause the motor vehicle to enter a freewheel running condition with internal combustion engine off if said automotive electronic control system determines the occurrence, at, or within a given time ($T_{ES\&S1}$) from, the occurrence of said action and the maintaining for a given time ($T_{ES\&S2}$) of at least one of the following additional entry conditions:

the selector SL is not activated by the driver of the motor vehicle, or the motor vehicle driver activates the selector SL so as to cause said selector SL to assume the aforementioned specific operative position, e.g., the operative position associated with the neutral mode or a predetermined operative position associated with the freewheel running condition with internal combustion engine off.

In other words, in the case of a motor vehicle with automatic transmission, an actuation of the selector SL by the driver such as to cause said selector SL to assume an operative position different from said specific operative position may conveniently be a disabling condition for the motor vehicle to enter a freewheel running condition with internal combustion engine off, while an actuation of the selector SL by the driver such as to cause said selector SL to assume the aforementioned specific operative position may conveniently be an enabling condition for the motor vehicle to enter a freewheel running condition with internal combustion engine off.

Conveniently, the automotive electronic control system is designed to cause the motor vehicle to enter a freewheel running condition with internal combustion engine off if said automotive electronic control system determines the occurrence, at, or within a given time ($T_{ES\&S1}$) from, the occurrence of said action and the maintaining for a given time ($T_{ES\&S2}$) of also at least one of the following additional entry conditions:

the rotation angle of the steering wheel, relative to the position of the steering wheel which causes a straight orientation of the steering wheels of the motor vehicle, i.e., with respect to the position of the steering wheel which causes the motor vehicle to go straight, is within a predetermined range of values of rotation angle allowed, for example, is between −85° and +85°;

the level of depression of the servo-assisted brake, compared to a respective standard level of operative pressure, is higher than a first predetermined threshold of depression;

the motor vehicle driver's seat belt is fastened, or the driver fastens the respective seat belt;

predetermined conditions for the saving of fuel by the internal combustion engine ICE occur, such as the so-called light-off procedure of the catalytic converter is finished, the temperature of the coolant of the internal combustion engine ICE is comprised in a predetermined range of values of coolant temperature allowed, etc.;

a time has passed greater than, or equal to, a predetermined guard time Δt, for example more than 2 seconds have passed since the last leaving of the motor vehicle from a freewheel running condition with internal combustion engine off;

the gradient of the road traveled by the motor vehicle is within a predetermined range of values of gradient allowed, for example is between −3% and +5%;

the on-board electrically powered/driven vehicle systems that need to be powered/driven with an electrical power greater than a predetermined threshold of electrical power, such as the cooling fan for the internal combustion engine ICE and the rear window heating, are off i.e., not activated;

the air conditioning system is off, or it is activated with an air conditioning temperature comprised within a predetermined range of conditioning-temperature allowed;

any of the following active control systems are not active: the Traction Control System—TCS, also known as Anti-slip Regulation (ASR) system, the MSR system (from the German "Motor Schleppmoment Regelung") that governs the braking torque in climbing, the Antilock Braking System ABS, the Motor vehicle Dynamic Control (VDC) system, and the Hydraulic Braking Assist (HBA) system;

understeer or oversteer conditions do not occur.

The automotive electronic control system according to embodiments of the present invention is also designed to cause, i.e., control the motor vehicle to leave from a freewheel running condition with internal combustion engine off if said automotive electronic control system detects, or determines, during a freewheel running condition with internal combustion engine off, the occurrence of at least one of the following exit conditions:

the accelerator pedal AP is pressed by the driver of the motor vehicle;

the brake pedal is pressed by the driver of the motor vehicle so as to cause a deceleration of the motor vehicle greater than a predetermined deceleration threshold;

the hand brake is activated by the driver of the motor vehicle;

the motor vehicle speed is comprised within one or more predetermined speed values interval/s not allowed, for example, is greater than 78 Km/h;

the rotation angle of the steering wheel, with respect to the position of the steering wheel which causes a straight orientation of the motor vehicle steering wheels, i.e., with respect to the position of the steering wheel which causes the motor vehicle to go straight, is comprised within one or more predetermined speed values interval/s not allowed, for example, is less than −90° or is greater than +90°;

the state of electric charge of each electrical energy storage device, for example of each of the two batteries ACC1 and ACC2, is less than a second predetermined threshold of electric charge, for example, is less than 70% of the respective complete electric charge;

the status of functional integrity of each electrical energy storage device, for example of each of the two batteries ACC1 and ACC2, is less than a second predetermined threshold of functional integrity state;

in the case of a diesel motor vehicle equipped with a Diesel Particulate Filter—DPF), the process of regeneration of the DPF is activated;

in the case of a diesel motor vehicle equipped with a DPF regenerable via the use of a catalytic converter and in the case of a gasoline motor vehicle equipped with a catalytic converter, a quantity indicative of the catalytic converter temperature is below a predetermined threshold of temperature of the catalytic converter;

a quantity indicative of the internal combustion engine ICE temperature, such as the coolant temperature of the internal combustion engine ICE, is comprised within one or more predetermined interval/s of not allowed engine temperature values, in one or more predetermined interval/s of not allowed coolant values;

on-board electrically powered/driven systems are activated which need to be powered/driven with an electrical power greater than the predetermined threshold of electrical power, for example the internal combustion engine ICE cooling fan, the heated rear window and the air-conditioning system are activated with an air conditioning temperature comprised within one or more predetermined interval/s of not allowed air conditioning temperature values;

the current freewheel running condition with internal combustion engine off lasts more than a predetermined maximum duration $\Delta T_{MAX}$, for example the freewheel running condition with internal combustion engine off lasts for more than 120 seconds;

the level of depression of the servo-assisted brake, compared to the respective standard operative level of pressure, is below a second predetermined threshold of depression;

the gradient of the road traveled by the motor vehicle is comprised within one or more predetermined interval/s of gradient values not allowed, for example, is less than −5% or is greater than +7%;

the particular on-board systems/components report faults and/or malfunctions;

the motor vehicle driver unfastens the seat belt;

an understeering or oversteering condition occurs;

at least one of the following active control systems is active: the Antislip Regulation ASR System, the MSR system, the Antilock Braking System ABS, the Motor vehicle Dynamic Control VDC system, and the Hydraulic Braking Assist HBA system.

Conveniently, the electronic control system is designed to cause the motor vehicle to leave a freewheel running condition with internal combustion engine off also if said automotive electronic control system determines the occurrence of at least one of the following further exit conditions:

in the case of a motor vehicle with manual transmission, the clutch pedal is pressed and/or the gearbox lever is activated by the motor vehicle driver to engage a gear; whereas, in the case of a motor vehicle with automatic transmission, the selector SL is activated by the motor vehicle driver.

Alternatively, in the case of a motor vehicle with automatic transmission, the automotive electronic control system may be conveniently designed to cause the motor vehicle to leave a freewheel running condition with internal combustion engine off also if said automotive electronic control system determines the occurrence of the following additional exit condition:

the motor vehicle driver activates the selector SL so as to cause said selector SL to assume an operative position different from said specific operative position.

Therefore, as previously described, to increase the driving comfort of a motor vehicle with automatic transmission, the automotive electronic control system may be conveniently designed to allow the motor vehicle driver to activate the selector SL so as to cause said selector SL to assume the aforementioned specific operative position (for example the operative position associated with the neutral mode or a predetermined operative position associated with the freewheel running condition with internal combustion engine off):

in order to cause the entering and leaving of the motor vehicle from a freewheel running condition with internal combustion engine off; and/or at, or within a given time ($T_{ES\&S1}$) from, the occurrence of an action indicative of the driver's will to enter a freewheel running condition with internal combustion engine off without thereby blocking the entry of the motor vehicle in a freewheel running condition with internal combustion engine off and/or;

during a freewheel running condition with internal combustion engine off without therefore causing the motor vehicle to leave a freewheel running condition with internal combustion engine off.

Relatively to the actuation of the brake pedal by the driver during a freewheel running condition with internal combustion engine off, as previously described, the automotive electronic control system causes the motor vehicle to leave said condition if it determines that the brake pedal is pressed by the driver so as to cause a deceleration of the motor vehicle greater than the aforementioned predetermined deceleration threshold, while the automotive electronic control system does not intervene if it determines that the brake pedal is pressed by the driver so as to cause a deceleration of the motor vehicle lower than, or at most equal to, said predetermined deceleration threshold. Therefore, if, during a freewheel running condition with internal combustion engine off, the brake pedal is pressed by the driver so as to cause a deceleration of the motor vehicle lower than the aforementioned predetermined deceleration threshold, the motor vehicle can decelerate until entering into an operative condition of a classic "Stop & Start" system from which the motor vehicle may leave at the occurrence of the respective predetermined exit conditions. In that regard, the automotive electronic control system may be conveniently designed to cause the motor vehicle to leave a freewheel running condition with internal combustion engine off if said automotive electronic control system determines the occurrence of the following additional exit condition:

the brake pedal is released and the motor vehicle speed is below a predetermined speed threshold, e.g., 3 Km/h.

Even more conveniently, in the case of a motor vehicle with automatic transmission, the automotive electronic control system can be designed to cause the motor vehicle to leave a freewheel running condition with internal combustion engine off if said automotive electronic control system determines the occurrence of at least one of the following further exit conditions:

the brake pedal is released, the motor vehicle speed is below a predetermined speed threshold, e.g., 3 Km/h, and the selector SL is not in said specific operative position;

the motor vehicle speed is below a predetermined speed threshold and the selector SL, which is in said specific operative position, is activated by the driver so as to assume a different operative position.

It is important to emphasize the fact that, in the case of a motor vehicle with automatic transmission, if the driver activates the selector SL so as to cause said selector SL to assume the abovementioned operative position (for example the operative position associated with the neutral mode or a predetermined operative position associated with the freewheel running condition with internal combustion engine off) in order to cause the motor vehicle to enter a freewheel running condition with internal combustion engine off, or at, or within a given time ($T_{ES\&S1}$) from, the occurrence of an action indicative of the driver's will to enter a freewheel running condition with internal combustion engine off, or during a freewheel running condition with internal combustion engine off, the electronic control unit ECU or PWT-ECU of the powertrain PWT, in response to such activation of the selector SL by the driver, can actuate the driveline T according to different actuation strategies that depend on the design choices of the manufacturer.

For example, if the driver activates the selector SL so as to cause said selector SL to assume the abovementioned operative position during a freewheel running condition with internal combustion engine off, the electronic control unit ECU or PWT-ECU powertrain PWT, while maintaining disengaged the driveline T, may conveniently engage a speed ratio suitable to crank the internal combustion engine ICE.

Preferably, the motor vehicle can be equipped with a specific Human-Machine Interface—HMI (not shown) coupled to the automotive electronic control system designed to enable/disable the operation of said automotive electronic control system. For example, the specific HMI may comprise a button or a lever arranged on the steering wheel or on the dashboard or in correspondence to the instrument panel and operable by the motor vehicle driver to enable/disable the operation of the automotive electronic control system. In this case, the automotive electronic control system is designed for:

causing the motor vehicle to enter a freewheel running condition with internal combustion engine off if the operation of said automotive electronic control system is not disabled by said specific HMI, and causing the motor vehicle to leave a freewheel running condition with internal combustion engine off if, during said freewheel running condition with internal combustion engine off, the operation of said automotive electronic control system is disabled by said specific HMI.

Conveniently, the automotive electronic control system is designed for:

in the case of a motor vehicle with automatic transmission,
causing, i.e., controlling said motor vehicle to enter a freewheel running condition with internal combustion engine off by sending input commands such as to cause the engagement of the driveline T and the switching off of the internal combustion engine ICE, and causing, i.e., controlling said motor vehicle to leave a freewheel running condition with internal combustion engine off by sending output commands such as to cause the cranking of the internal combustion engine ICE and the disengagement of the driveline T, whereas, in the case of a motor vehicle with manual transmission,
causing, i.e., controlling said motor vehicle to enter a freewheel running condition with internal combustion engine off by sending input commands such as to cause the switching off of the internal combustion engine ICE, and causing, i.e., controlling said motor vehicle to leave a freewheel running condition with internal combustion engine off by sending output commands such as to cause the cranking of the internal combustion engine ICE.

In particular, the automotive electronic control system can be conveniently coupled:

in the case of a motor vehicle with automatic transmission, to the single electronic control unit ECU of the internal combustion engine ICE and of the powertrain PWT, or to the two different electronic control units E-ECU and PWT-ECU of the internal combustion engine ICE and of the powertrain PWT to cause switching off and cranking up of the internal combustion engine ICE and the disengagement and engagement of the driveline T, and, in the case of a motor vehicle with a manual transmission, the electronic control unit E-ECU of the internal combustion engine ICE to cause switching off and cranking up of the internal combustion engine ICE.

Conveniently, the electronic control system is coupled to other on-board automotive components/systems/sensors to receive input signals/data on which basis said automotive electronic control system is able to determine the occurrence of the actions indicative of the driver's will of entering freewheel running condition with internal combustion engine off, and the occurrence and maintaining of the entering and exit conditions.

In particular, in order to determine the occurrence of the actions indicative of the driver's will to enter a freewheel running condition with internal combustion engine off, and the occurrence and the maintaining of entry and exit conditions, the automotive electronic control system may conveniently be coupled:

to the accelerator pedal AP, or to the position sensor of the accelerator pedal AP, or to the single electronic control unit ECU of the internal combustion engine ICE and of the powertrain PWT, or to the electronic control unit E-ECU of the internal combustion engine ICE to receive signals/data that indicate whether said accelerator pedal AP is pressed or released;

to the brake pedal, or by the brake pedal sensor, or to an electronic control unit of the braking system for receiving signals/data that indicate whether said brake pedal is pressed or released;

to the hand brake, or to a sensor coupled to the hand brake, or to an associated electronic control unit for receiving signals/data that indicate whether said hand brake is activated or not;

in the case of a motor vehicle with automatic transmission, to the selector SL, or to the single electronic control unit ECU of the internal combustion engine ICE and of the powertrain PWT, or to the electronic control unit PWT-ECU of the powertrain PWT, or to a relative electronic control unit for receiving signals/data that indicate which is the current operative position of the selector SL;

in the case of a motor vehicle with a manual transmission, the clutch pedal and the gearbox lever, or to a relative electronic control unit, or sensors associated with the clutch pedal and to the gearbox lever for receiving signals/data that indicate which is the current position of the clutch pedal and the gearbox lever;

to a motor vehicle tachometer, or to the single electronic control unit ECU of the internal combustion engine ICE and of the powertrain PWT, or to the two different electronic control units E-ECU and PWT-ECU of the internal combustion engine ICE and of the powertrain PWT to receive signals/data that indicate the instantaneous speed of said motor vehicle;

to the control unit ES-ECU of the electric system ES, or to the dual battery manager DBM, or to the sensors BMS to receive signals/data that indicate the state of electrical charge and the state of functional integrity of each of the two batteries ACC1 and ACC2, which on-board electrically powered/driven systems are activated and with how much electric power are powered/driven;

to said specific on-board systems/components to receive signals/data that indicate possible faults and malfunctions;

to the steering wheel, or to a sensor coupled to the steering wheel, or to a relative electronic control unit for receiving signals/data that indicate the rotation angle of the steering wheel;

in the case of a diesel motor vehicle equipped with a DPF, to the single electronic control unit ECU of the internal combustion engine ICE and of the powertrain PWT, or to the electronic control unit E-ECU of the internal combustion engine ICE, or to a relative electronic control unit for receiving signals/data that indicate whether the process of regeneration of the DPF is activated;

in the case of a diesel motor vehicle equipped with a DPF regenerable by the use of a catalytic converter, to the single electronic control unit ECU of the internal combustion engine ICE and of the powertrain PWT, or to the electronic control unit E-ECU of the internal combustion engine ICE, or to a relative electronic control unit for receiving signals/data that indicate the estimated temperature of the catalytic converter;

to a coolant temperature sensor of the internal combustion engine ICE, or to the single electronic control unit ECU of the internal combustion engine ICE and of the powertrain PWT, or to the electronic control unit E-ECU of the internal combustion engine ICE to receive signals/data that indicate the temperature of the internal combustion engine ICE, or the coolant temperature of the internal combustion engine ICE;

to the servo-assisted brake, or to a sensor coupled to the servo-assisted brake, or to a relative electronic control unit for receiving signals/data that indicate the current level of depression of the servo-assisted brake;

to a sensor of the gradient of the road traveled by the motor vehicle (for example an inclinometer/accelerometer), or to a relative electronic control unit for receiving signals/data that indicate the gradient of the road traveled by the motor vehicle;

to a sensor coupled to the driver's seat belt, or to a relative electronic control unit for receiving signals/data that indicate if said seat belt is fastened or not;

to said active control systems to receive signals/data that indicate whether said active control systems are active or not;

to the air conditioning system for receiving signals/data that indicate the current set air-conditioning temperature;

to the specific means activable by a user to receive the specific executive command of entering the freewheel running condition with internal combustion engine off by the motor vehicle driver;

etc.

From the above description, one can immediately understand the advantages of embodiments of the present invention.

In particular, it is important to emphasize the fact that embodiments of the present invention optimize fuel consumption and improve driving comfort and security of a motor vehicle.

Finally, it is clear that what is described and illustrated may be subject to modifications and variations without thereby departing from the scope of the present invention, as defined in the appended claims.

Moreover, the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An automotive electronic control system for a motor vehicle comprising a powertrain and an electric system; the powertrain comprising an internal combustion engine and a driveline; the driveline comprising a gearbox and a clutch; the electrical system comprising electrical energy storage devices;

the automotive electronic control system being designed to receive quantities indicative of operative conditions of the motor vehicle, of the powertrain and of on-vehicle systems/components;

the automotive electronic control system being designed to cause the motor vehicle to enter a freewheel running condition with internal combustion engine off if the automotive electronic control system determines, based on the received quantities, occurrence of a driver-performable action indicative of the will of the driver to enter a freewheel running condition with internal combustion engine off, and occurrence, at or within a given time from the occurrence of the driver-performable action and the maintaining for a given time of all the following entry conditions:
a brake pedal is not operated;
a hand brake is not operated;
a motor vehicle speed is within a predetermined allowable speed range;
an electric charge state of each electrical energy storage device is over a first predetermined electric charge threshold;
a functional integrity state of each electrical energy storage device is over a first predetermined functional integrity threshold, and
failure and/or malfunction is not signaled for specific on-vehicle systems/components;
the automotive electronic control system being further designed to cause the motor vehicle to leave a freewheel running condition with internal combustion engine off if the automotive electronic control system determines, based on the received quantities, occurrence of at least one of the following exit conditions:
an accelerator pedal is operated;
a brake pedal is operated in such a way as to cause a motor vehicle deceleration over a predetermined deceleration threshold;
a hand brake is operated;
a motor vehicle speed is within one or more predetermined unallowable speed ranges;
a rotation angle of a steering wheel is within one or more predetermined unallowable rotation angle ranges;
an electric charge state of each electrical energy storage device is below a second predetermined electric charge threshold;
a functional integrity state of each electrical energy storage device is below a second predetermined functional integrity threshold;
a quantity indicative of a temperature of the internal combustion engine is within one or more predetermined unallowable temperature ranges;
on-vehicle electrically powered/driven systems are operated which need to be powered/driven with an electrical power higher than a predetermined electrical power threshold;
the freewheel running condition with internal combustion engine off lasts more than a predetermined maximum duration;
a depression level of a servo-assisted brake is below a first predetermined depression threshold;
a slope of the road traveled by the motor vehicle is within one or more predetermined unallowable road slope ranges;
failure and/or malfunction is signaled for specific on-vehicle systems/components;
a driver seat belt is unfastened;
the automotive electronic control system determines occurrence of an understeering or oversteering condition;
at least one of the following active control systems is active: an antislip regulation system, an engine braking regulation system, an antilock braking system, a vehicle dynamic control system, and an hydraulic braking assist system.

2. The automotive electronic control system of claim 1, wherein the specific on-vehicle systems/components comprise one or more of the following:
one or more electronic control units for the internal combustion engine and the powertrain;
a control unit for the electrical system;
a manager of the electrical energy storage devices;
sensors associated with the electrical energy storage devices to determine the state of electric charge and of functional integrity thereof;
an accelerator pedal position sensor;
on-vehicle safety-critical systems/components;
sensors associated with the on-vehicle safety-critical systems/components.

3. The automotive electronic control system according to claim 1, designed to be installed on board of a motor vehicle with a servo-actuated driveline, and to detect occurrence of a driver-performable action indicative of the will of the driver to enter a freewheel running condition with internal combustion engine off if the automotive electronic control system determines, based on the received quantities, occurrence of the following condition:
the accelerator pedal is released.

4. The automotive electronic control system according to claim 1, designed to be installed on board of a motor vehicle with a servo-actuated driveline and a selector operable to assume different operative positions each associated with a corresponding operation mode of the driveline;
wherein the automotive electronic control system is designed to detect occurrence of a driver-performable action indicative of the will of the driver to enter a freewheel running condition with internal combustion engine off if the automotive electronic control system determines, based on the received quantities, occurrence of the following condition:
the accelerator pedal is released and either a specific operation of the selector is performed or the selector is operated in such a way as to cause the selector to assume a specific operative position.

5. The automotive electronic control system according to claim 1, designed to be installed on board of a motor vehicle with a servo-actuated driveline and a selector operable to assume different operative positions each associated with a corresponding operation mode of the driveline;
wherein the automotive electronic control system is designed to cause the motor vehicle to enter a freewheel running condition with internal combustion engine off if the automotive electronic control system determines occurrence at or within a given time from the occurrence of the diver-performable action and the maintaining for a given time of also the following additional entry condition:
the selector is not operated.

6. The automotive electronic control system according to claim 1, designed to be installed on board of a motor vehicle with a servo-actuated driveline and a selector operable to assume different operative positions each associated to a corresponding operation mode of the driveline;
wherein the automotive electronic control system is designed to cause the motor vehicle to enter a freewheel running condition with internal combustion engine off if the automotive electronic control system determines occurrence at or within a given time from the occurrence of the driver-performable action and the maintaining for a given time also of at least one of the following additional entry conditions:
the selector is not operated;
the selector is operated in such a way as to cause the selector to assume a specific operative position.

7. The automotive electronic control system according to claim 1, designed to be installed on board of a motor vehicle with a servo-actuated driveline and a selector operable to assume different operative positions each associated with a corresponding operation mode of the driveline;

wherein the automotive electronic control system is designed to cause the motor vehicle to leave a freewheel running condition with internal combustion engine off if the automotive electronic control system determines occurrence of the following additional exit condition:

the selector is operated by the driver.

8. The automotive electronic control system according to claim 1, designed to be installed on board of a motor vehicle with a servo-actuated driveline and a selector operable to assume different operative positions each associated to a corresponding operation of the driveline;

wherein the automotive electronic control system is designed to cause the motor vehicle to leave a freewheel running condition with internal combustion engine off if the automotive electronic control system determines occurrence of the following additional exit condition:

the selector is operated in such a way as to cause the selector to assume an operative position different from a specific operative position.

9. The automotive electronic control system according to claim 1, designed to be installed on board of a motor vehicle with a servo-actuated driveline and a selector operable to assume different operative positions each associated with a corresponding operation mode of the driveline;

wherein the automotive electronic control system is designed to cause the motor vehicle to leave a freewheel running condition with internal combustion engine off if the automotive electronic control system determines occurrence of at least one of the following additional exit conditions:

the brake pedal is released, the motor vehicle speed is below a predetermined speed threshold and the selector is not in a specific operative position;

the motor vehicle speed is below a predetermined speed threshold and the selector, which is in the specific operative position, is operated in such a way as to assume a different operative position.

10. The automotive electronic control system according to claim 1, designed to be installed on board of a motor vehicle with a manually-operable transmission and to detect occurrence of a driver-performable action indicative of the will of the driver to enter a freewheel running condition with internal combustion engine off if the automotive electronic control system determines, based on the received quantities, occurrence of the following entry condition:

a gearbox lever is operated to cause the gearbox to be put in neutral and then a clutch pedal is released.

11. The automotive electronic control system according to claim 1, designed to be installed on board of a motor vehicle with a manually-operable transmission and to cause the motor vehicle to enter a freewheel running condition with internal combustion engine off if the automotive electronic control system determines occurrence at or within a given time from the occurrence of the driver-performable action and the maintaining for a given time also of at least one of the following additional entry conditions:

a clutch pedal is not operated, and/or a gearbox lever is not operated.

12. The automotive electronic control system according to claim 1, designed to be installed on board of a motor vehicle with a manually-operable transmission and to cause the motor vehicle to leave a freewheel running condition with internal combustion engine off if the automotive electronic control system determines occurrence of at least one of the following additional exit conditions:

a clutch pedal is operated;

a gearbox lever is operated to cause a gear to be engaged.

13. The automotive electronic control system according to claim 1, comprising specific on-vehicle user-operable means designed to detect occurrence of a driver-performable action indicative of the will of the driver to enter a freewheel running condition with internal combustion engine off if the automotive electronic control system determines, based on the received quantities, occurrence of the following entry condition:

a specific executive command is imparted via the specific on-vehicle user-operable means to enter a freewheel running condition with internal combustion engine off.

14. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:

a rotation angle of the steering wheel is within a predetermined allowable rotation angle range.

15. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:

a depression level of a servo-assisted brake is higher than a second predetermined depression threshold.

16. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:

a driver seat belt is fastened.

17. The automotive electronic control system according to claim 1, designed to cause the motor vehicle to enter a freewheel running condition with internal combustion engine off if the automotive electronic control system determines occurrence at or within a given time from the occurrence of the driver-performable action and the maintaining for a given time of also predetermined fuel-saving conditions.

18. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:

a time has passed higher than or equal to a predetermined guard time from the last leaving of the motor vehicle from a freewheel running condition with internal combustion engine off.

19. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:
slope of a road traveled by the motor vehicle is within a predetermined allowable road slope range.

20. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:
on-vehicle electrically powered/driven systems which need to be powered/driven with an electrical power higher than a predetermined electrical power threshold are not operated.

21. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:
the air conditioning system is either not operated or is operated with an air temperature within a predetermined allowable air temperature range.

22. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:
none of the following active control systems is operated: antislip regulation system, engine braking control system, antilock braking system, vehicle dynamic control system, and hydraulic braking assist system.

23. The automotive electronic control system according to claim 1, further designed to cause the motor vehicle to enter a freewheel running condition with internal combustion engine off if the automotive electronic control system determines occurrence at or within a given time from the occurrence of the driver-performable action and the maintaining for a given time of also the following additional entry condition:
no understeering or oversteering condition occurs.

24. The automotive electronic control system according to claim 1, designed to be installed on board of a motor vehicle equipped with a diesel particulate filter regenerable by way of a catalytic converter;
and wherein the electronic control system is designed to cause the motor vehicle to leave a freewheel running condition with internal combustion engine off if said automotive electronic control system determines the occurrence of at least one of the following additional exit conditions:
the regeneration process of the particulate filter is activated; and/or
a quantity indicative of the catalytic converter temperature is below a predetermined threshold temperature of the catalytic converter.

25. The automotive electronic control system according to claim 1, designed to be installed on board of a gasoline motor vehicle equipped with a catalytic converter;
and wherein the electronic control system is designed to cause the motor vehicle to leave a freewheel running condition with internal combustion engine off if the automotive electronic control system determines occurrence of the following additional exit condition:
a quantity indicative of a catalyst temperature is below a predetermined threshold catalytic converter temperature.

26. An automotive electronic control unit for an automotive electronic control system of a motor vehicle which comprises a powertrain and an electric system; the powertrain comprising an internal combustion engine and a driveline; the driveline comprising a gearbox and a clutch; the electrical system comprising electrical energy storage devices;
the automotive electronic control unit being designed to receive quantities indicative of operative conditions of the motor vehicle, of the powertrain and of on-vehicle systems/components;
the automotive electronic control unit being further designed to cause the automotive electronic control system to become designed as claimed in claim 1.

27. A motor vehicle comprising a powertrain and an electric system; the powertrain comprising an internal combustion engine and a driveline; the driveline comprising a gearbox and a clutch; the electrical system comprising electrical energy storage devices; the motor vehicle further comprising the automotive electronic control system as claimed in claim 1.

28. A software loaded onto processing means of an automotive electronic control system of a motor vehicle comprising a powertrain and an electric system; the powertrain comprising an internal combustion engine and a driveline; the driveline comprising a gearbox and a clutch; the electrical system comprising electrical energy storage devices;
the processing means being designed to receive quantities indicative of operative conditions of the motor vehicle, of the powertrain and of on-vehicle systems/components;
the software being designed to cause, when executed, the automotive electronic control system to become designed as claimed in claim 1.

* * * * *